(No Model.)

M. CARPENTER.
ANIMAL TRAP.

No. 510,836. Patented Dec. 12, 1893.

Witnesses:
A. Davenport
E. Behel

Inventor:
Monroe Carpenter
By A. O. Behel
Atty.

THE NATIONAL LITHOGRAPHING COMPANY,
WASHINGTON, D. C.

UNITED STATES PATENT OFFICE.

MONROE CARPENTER, OF ROCKFORD, ILLINOIS, ASSIGNOR OF ONE-HALF TO ISAAC C. SARGENT, OF SAME PLACE.

ANIMAL-TRAP.

SPECIFICATION forming part of Letters Patent No. 510,836, dated December 12, 1893.

Application filed July 22, 1893. Serial No. 481,231. (No model.)

*To all whom it may concern:*

Be it known that I, MONROE CARPENTER, a citizen of the United States, residing at Rockford, in the county of Winnebago and State of Illinois, have invented certain new and useful Improvements in Animal-Traps, of which the following is a specification.

The object of this invention is to construct an animal trap having a pivoted platform and a tripping pan operating a spring actuated bolt so that the weight of the animal upon the plate or pan will release the platform precipitating the animal down an incline against a swinging door into a receiving cage.

Figure 1:
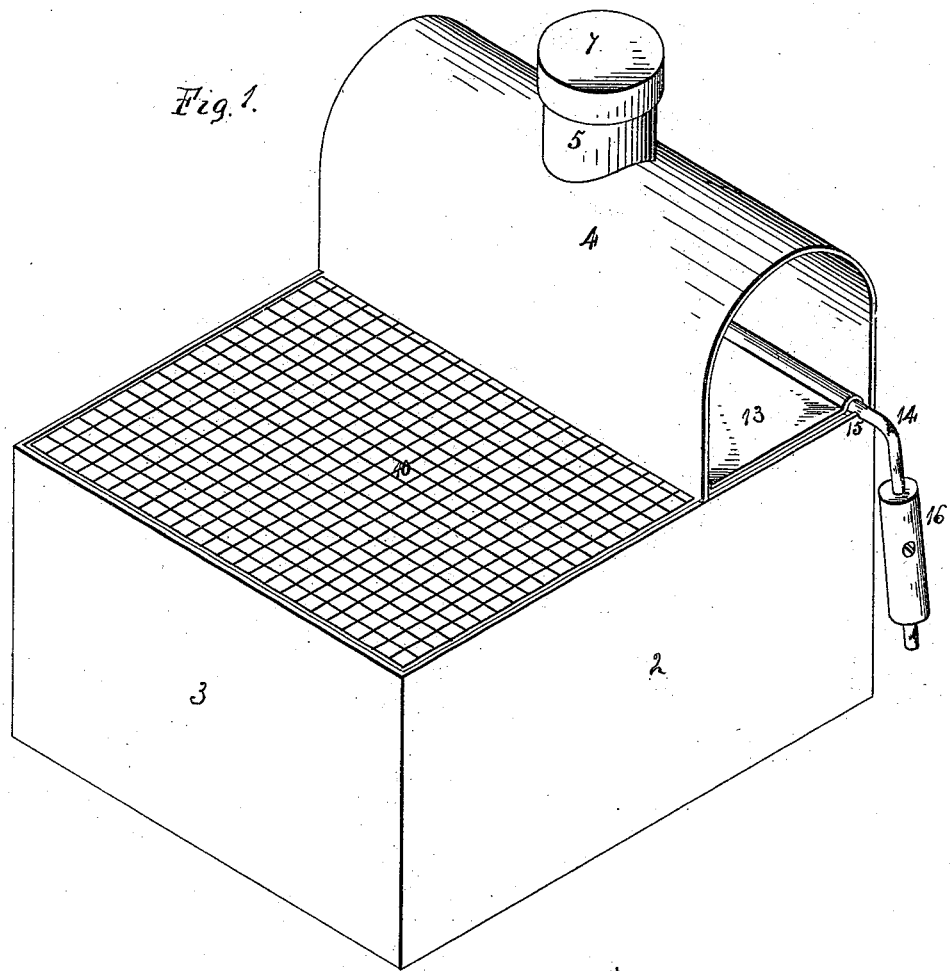
Figure 2:
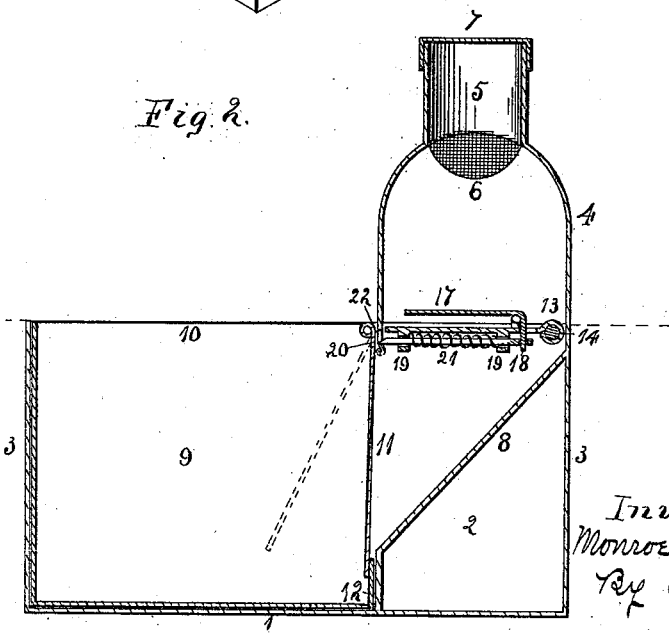

In the accompanying drawings; Figure 1, is an isometrical representation of my improved trap. Fig. 2, is a lengthwise vertical central section.

The main portion of the trap is composed of a bottom 1, sides 2, and ends 3. One of the ends has a curved extension 4, forming a transverse passage way. In the center of the curved extension is located a bait box having a perforated or screen bottom 6, and a removable cover 7. In one end of the main portion of the trap is located an incline 8. A removable animal receiving cage 9, in this instance has its top covered with wire netting 10. A door 11, has a swinging engagement with the top of the box, and shuts against a stop 12, at the lower corner of the cage. A platform 13, has a connection with a rod or bar 14, which rests in recesses 15, formed in the sides 2, within the space bounded by the curved extension 4, and a weight 16, is adjustably connected to one end of the bar, its action being to return the platform in a horizontal position. To the center of the length of this platform directly under the bait box is pivoted a pan 17, having a depending arm 18. From the under side of the platform depend perforated ears 19, within which is located a bolt 20, having one end beveled, its other end being vertically perforated through which extends the arm 18. A spring surrounds the bolt 20, one end connected therewith and the other end resting against the inside of the forward ear. The forward beveled end of the bolt rests in a notch 22, cut in the main frame as shown at Fig. 2.

It is the intention to bury the trap in the ground up to the top or dotted line shown at Fig. 2, allowing room for the weight to swing, and in some instances the screen top may be covered with a board. Bait being placed in the bait box, the animal will be induced to enter the transverse passage way by walking upon the platform 13, and finally upon the pan 17, when the weight of the animal will be sufficient to retract the bolt 20, against the action of the spring 21 permitting the platform to move on its pivot dumping the animal down the incline 8, striking against the swinging door 11, landing him within the receiving cage, when the door will close itself and the weight 16, will return the platform to its normal position, and being sufficient to retract the bolt when it engages the notch 22, when the trap will be reset, this operation being repeated each time the pan is depressed.

By making the receiving cage removable the animals may be disposed of without removing the trap proper.

I claim as my invention—

1. An animal trap consisting of a receiving cage, a covered transverse passage way having a bait box in its upper portion, a pivoted platform, a trigger having a pivoted connection with the upper surface of the platform, a spring actuated bolt located on the under side of the platform operated by the pan, a stationary incline, and a swinging door to the receiving cage located at the bottom of the incline, the pivoted platform having a weight for returning it to its normal position.

2. An animal trap consisting of a receiving cage, a covered transverse passage way having a bait box in its upper portion, a pivoted platform, a trigger having a pivotal connection with the upper surface of the platform, a spring actuated bolt located on the under side of the platform operated by the pan, a stationary incline, and a swinging door to the receiving cage located at the bottom of the incline.

MONROE CARPENTER.

Witnesses:
  A. O. BEHEL,
  E. BEHEL.